Figure 3:
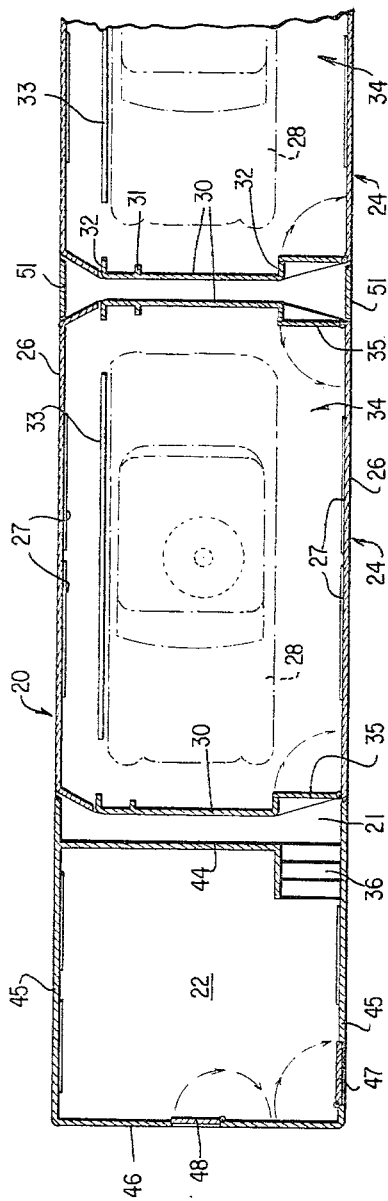

Jan. 11, 1966  R. LA MAR JOHNSON  3,228,352
RAILROAD CAR FOR TRANSPORTING AUTOMOBILES AND PASSENGERS
Filed July 19, 1963  4 Sheets-Sheet 1
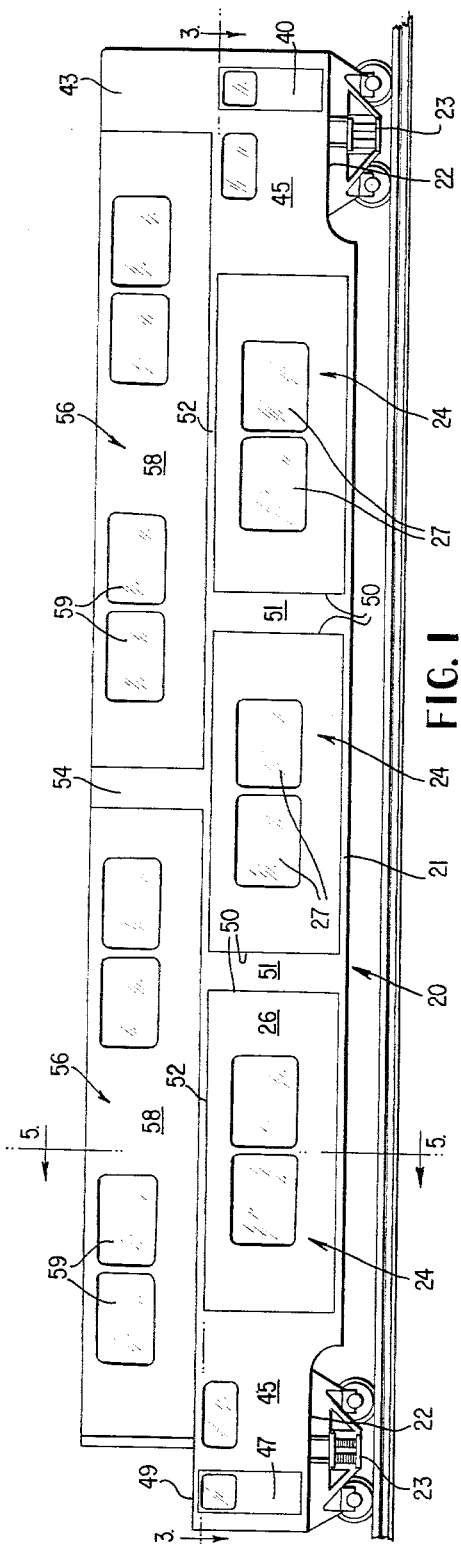
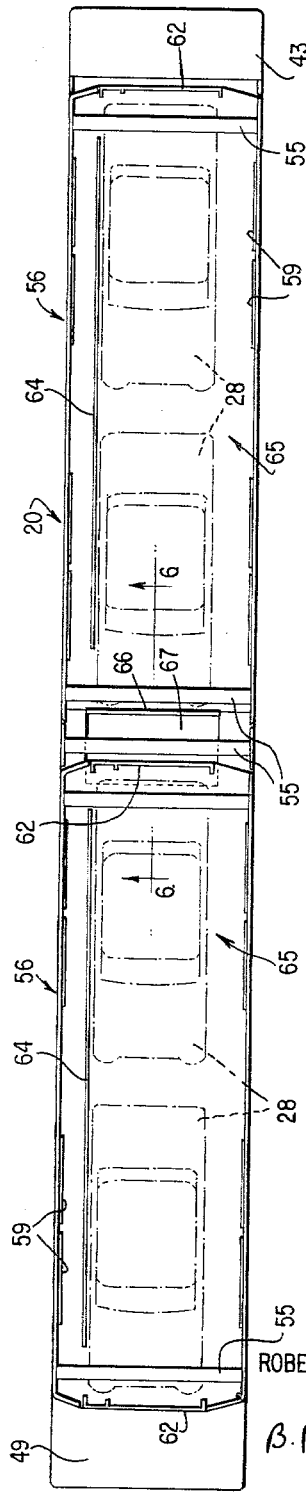
INVENTOR.
ROBERT L. JOHNSON
ATTORNEY Jan. 11, 1966   R. LA MAR JOHNSON   3,228,352
RAILROAD CAR FOR TRANSPORTING AUTOMOBILES AND PASSENGERS
Filed July 19, 1963   4 Sheets-Sheet 2

INVENTOR.
ROBERT L. JOHNSON
BY
B. P. Fishburne, Jr.
ATTORNEY

Jan. 11, 1966   R. LA MAR JOHNSON   3,228,352
RAILROAD CAR FOR TRANSPORTING AUTOMOBILES AND PASSENGERS
Filed July 19, 1963   4 Sheets-Sheet 3
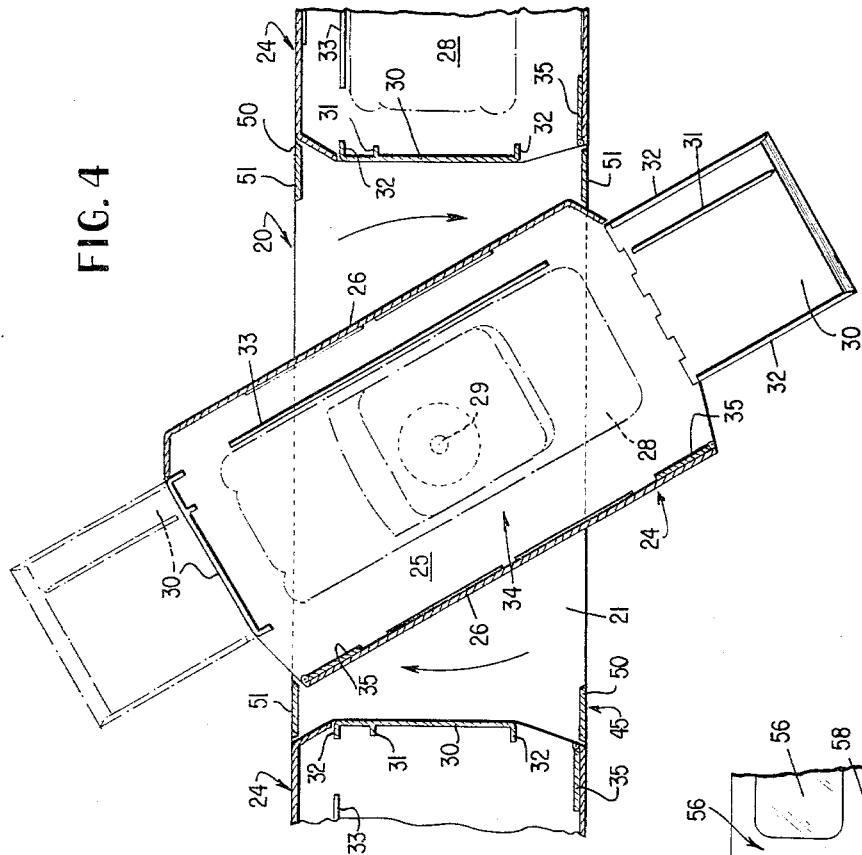
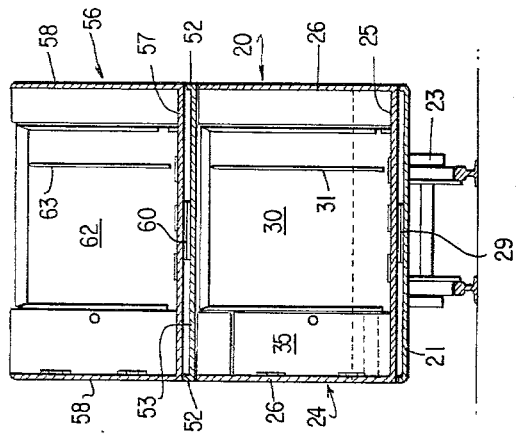
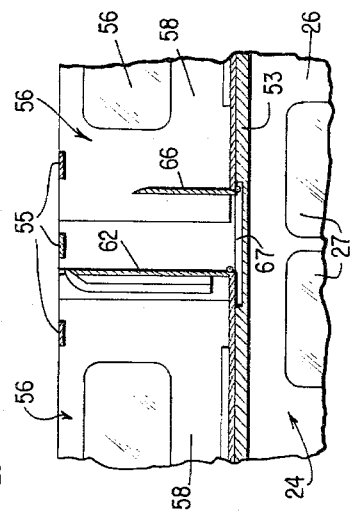
INVENTOR.
ROBERT L. JOHNSON
BY
*B. P. Fisheburn, Jr.*
ATTORNEY Jan. 11, 1966   R. LA MAR JOHNSON   3,228,352
RAILROAD CAR FOR TRANSPORTING AUTOMOBILES AND PASSENGERS
Filed July 19, 1963   4 Sheets-Sheet 4
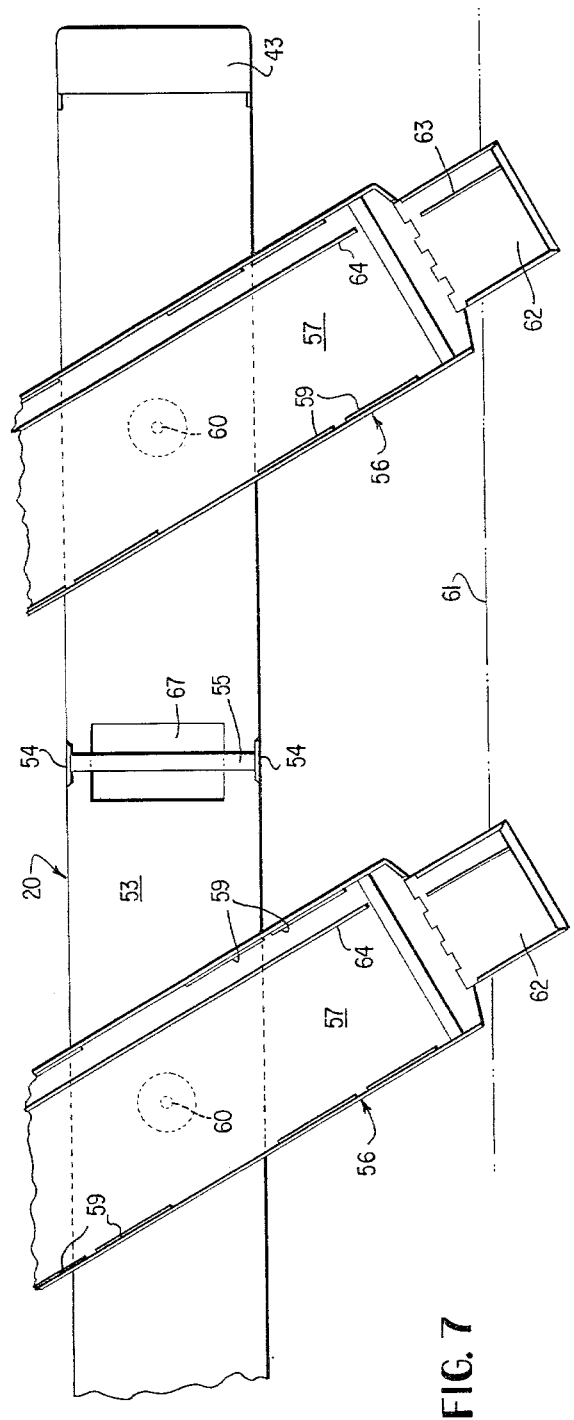
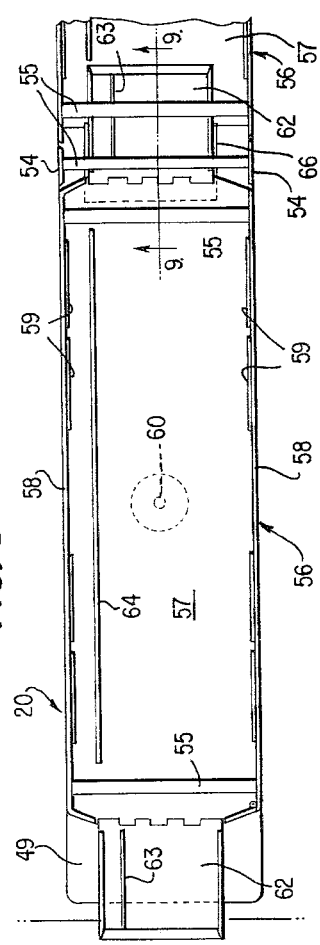
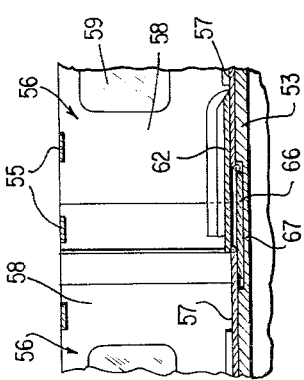
INVENTOR.
ROBERT L. JOHNSON
BY
*B. P. Fishburn, Jr.*
ATTORNEY

United States Patent Office 3,228,352
Patented Jan. 11, 1966

3,228,352
RAILROAD CAR FOR TRANSPORTING AUTO-
MOBILES AND PASSENGERS
Robert La Mar Johnson, Hoosier Court 9-6,
Indiana University, Bloomington, Ind.
Filed July 19, 1963, Ser. No. 296,201
5 Claims. (Cl. 105—368)

This invention relates to a railroad car for transporting vehicles.

An object of the invention is to provide a car for transporting automobiles for long distances on railways and constructed and arranged so that passengers may conveniently occupy their automobiles during transporting and may also have access to dining car facilities or sleeping car facilities on the same train, if preferred.

Another important object of the invention is to provide an automobile transporting car having upper and lower levels each adapted to contain several automobiles and each having passage means for passengers who wish to leave their automobiles and enter other sections of the train or change levels on the automobile transporting car.

Another object of the invention and a very important feature thereof resides in the provision of individual horizontally swingable automobile compartments on both levels of the transporting car to allow side loading or unloading of individual automobiles or selected numbers of automobiles at various stations along the railroad right-of-way with maximum efficiency and economy and in a minimum of time and without the necessity of uncoupling or switching the transporting car from the remainder of the train. The invention also allows straight or lengthwise loading of the automobiles on the upper level in cases where this may be desirable, and the car constituting the invention is therefore quite flexible in its utility, which constitutes another object of the invention.

Still another object is to provide a car of the mentioned character having washroom facilities and other passenger facilities at the ends thereof and readily accessible to passengers on either level of the car.

Another object is to provide a car of the mentioned character having hinged gate or ramp means which may be lowered to facilitate the side loading of automobiles from docks or elevated platforms at various stations along the right-of-way, and which gates may then be elevated to substantially enclose the automobiles in their individual compartments and to allow returning of the compartments to their normal positions lengthwise of the car.

Another object is to provide a railroad car for transporting automobiles which will afford good visibility to passengers riding in the automobiles upon the car and which will substantially protect and enclose the automobiles and passengers.

Other objects and advantages of the invention will be apparent during the course of the following description.

Figure 3A:
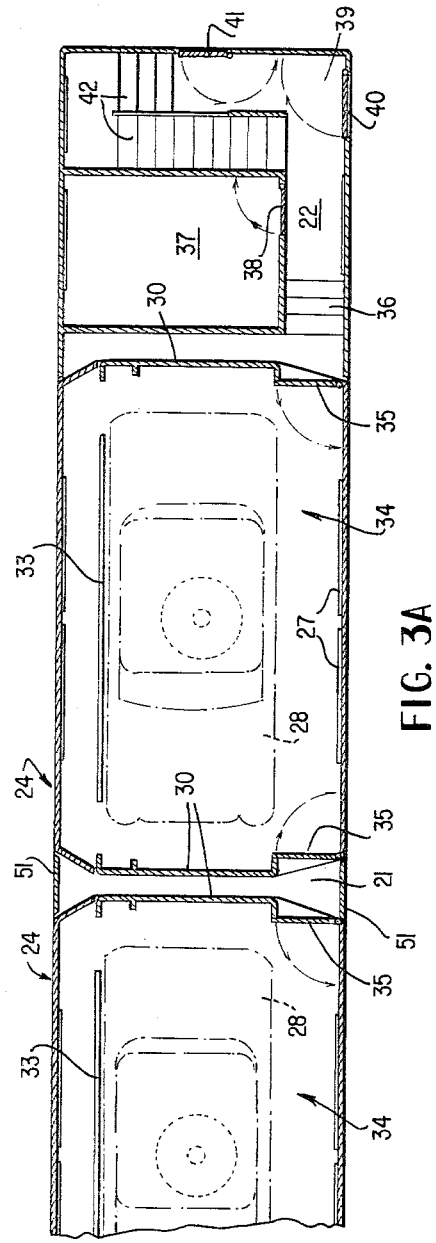

In the accompanying drawings forming a part of this application and in which like numerals are employed to designate like parts throughout the same, FIGURE 1 is a side elevation of an automobile transporting car embodying the invention, FIGURE 2 is a top plan view thereof, FIGURES 3 and 3a constitute an interrupted horizontal longitudinal cross section taken on line 3—3 of FIGURE 1, FIGURE 4 is a fragmentary horizontal sectional view similar to FIGURES 3 and 3a and illustrating the positioning of one of the lower level compartments for side loading or unloading, FIGURE 5 is a transverse vertical section taken on line 5—5 of FIGURE 1, FIGURE 6 is a fragmentary longitudinal vertical section taken on line 6—6 of FIGURE 2, FIGURE 7 is a fragmentary plan view of the upper level of the car with the automobile carrying compartments thereof arranged for side loading or unloading, FIGURE 8 is a plan view of the upper level of the car partly broken away with the compartments arranged for end loading or unloading, and FIGURE 9 is a fragmentary vertical section taken on line 9—9 of FIGURE 8.

The drawings are partly diagrammatic throughout in order to depict only the essentials of the invention. Conventional details of construction are purposely omitted for the sake of simplicity and clarity of illustration. For example, various components of the invention may be power-operated in any suitable manner and suitable conventional controls for the power means may be provided, if desired. Such features which form no direct part of the invention have been purposely omitted from the drawings and will not be described herein. The actual invention and its illustration and the following detailed description is concerned solely with the construction of a railroad car and car body for transporting vehicles and for loading and unloading the same, together with other lesser features which will be described and which are shown in the drawings.

In the drawings, wherein for the purpose of illustration is shown a preferred embodiment of the invention, the numeral 20 designates a railroad car for transporting automobiles in its entirety, said car having a low underslung flat bed or floor 21, suitably braced and framed and defining the bottom of the lower level of the two-level car. End portions 22 of the bed 21 are slightly elevated, FIGURE 1, and suitable trucks 23 of conventional construction are disposed beneath the elevated portions 22 to support the entire car 20 on rails.

On the bed 21 between the trucks and elevated floor portions 22 are preferably three equally sized and equi-distantly spaced single automobile carrying compartments 24. Each compartment 24 has its own floor 25 separate from and spaced slightly above the flat bed 21, FIGURE 5, and each compartment 24 has upstanding side walls 26 on opposite sides thereof integral or rigid with the compartment floor 25, therefore rendering each compartment U-shaped in cross section and substantially open at the top thereof. Each side wall 26 is equipped with large picture windows 27 allowing good visibility for the occupants of the automobile 28 in each compartment 24. The floor 25 of each lower compartment 24 is pivotally secured to the flat bed 21 by conventional vertical axis pivot means 29, allowing horizontal swinging of each compartment 24 as depicted in FIGURE 4. Power means, not shown, may be utilized for swinging or turning the individual compartments of the car and for operating other moving components of the invention, to be described. Since the power means and controls therefor may be entirely conventional, there is no necessity for illustrating or describing them in detail herein.

Each compartment 24 has hinged to opposite ends of the floor 25 thereof vertically swingable gates or ramps 30 which may be lowered to approximately horizontal positions, FIGURE 4, when the compartment is swung diagonally of the car approximately sixty degrees for loading or unloading. The gates 30 may be secured in the upright or closed positions by any conventional latch means, not shown. When lowered for loading, the gates 30 will rest upon the ramp or dock provided at one side of the railroad track so that the automobile may be driven directly onto the gate 30 and into the compartment 24. It is not necessary to swing each compartment 24 more than about sixty degrees from the longitudinal center line of the car 20 to facilitate loading as depicted in FIGURE 4. Each gate 30 has a guide rail 31 near one side thereof and a pair of side guide rails 32 or flanges. The wheels of the automobile 28 on one side are driven between the rails 31 and 32 for guidance into the compartment. An additional guide rail 33 on the floor 25 of each compartment 24 guides the vehicle and prevents it from approaching too closely to the near side wall of the compartment 24.

An aisle or passageway 34 for passengers is provided within each compartment 24 at the side thereof remote from the rail 33 and this aisle allows sufficient opening of the automobile doors so that passengers can readily enter or leave the automobile and walk along one side thereof from end-to-end of the compartment 24. At the end of each aisle 34, each compartment 24 is equipped with hinged doors 35, adapted to be held open as shown in FIGURE 4 or closed as shown in FIGURES 3 and 3a. When the doors 35 are opened, FIGURES 3 and 3a, a continuous aisle is provided along one side of the car 20 and through the several compartments 24 of the lower level. As best shown in FIGURES 3 and 3a, the aisle 34 at both ends of the car leads to the elevated floor portions 22 and steps 36 are provided so that passengers may step from the level of the floors 25 to the elevated floor portions 22. On one floor portion 22, FIGURE 3a, a fixed compartment 37 for washroom facilities and toilet facilities is provided and has an access door 38 leading to an L-shaped aisle 39 on the floor portion 22. A side door 40 is provided on one side of the car close to one end thereof so that passengers may leave or enter the car 20 at this point when the car is stationary. Another door 41 is provided centrally at one end of the car, so that passengers using the aisle 39 may enter the next adjacent car of the train. Steps 42 lead upwardly from one end of the aisle 39 to a closed transverse aisle or passageway 43 in the upper level of the car 20. At the opposite end of the car 20, FIGURES 1 and 3, the steps 36 also lead to the raised floor portion 22 and which floor portion may be enclosed by an L-shaped wall 44 defining with the side and end walls 45 and 46 of the car body a lounge room, storage room or the like. An additional side door 47 and an end door 48 are provided to allow access and egress from this lounge room on the level of the floor portion 22. This lounge room has a closed roof portion 49, as shown particularly in FIGURES 1 and 2.

At the lower level of the car 20, the main side walls 45 extend for the entire length of the car but have large rectangular openings 50 formed therethrough to accommodate the pivotal compartments 24. This arrangement results in the formation of narrow side wall portions 51 between adjacent compartments 24 and narrow horizontal side wall portions 52 above the compartments 24, as should be obvious from an inspection of the drawings.

Immediately above the compartments 24, FIGURE 5, the car 20 is divided horizontally by a wall or upper floor 53, rigidly interconnected with the main side walls 45 including portions 51 and 52. The roof portion 49 previously described may be an integral continuation of the wall 53. Above this divider wall 53, the car 20 has further side wall portions 54 which again are integral with the narrow portions 52 and the main side walls 45. Suitable cross braces 55 serve to rigidly interconnect the tops of the main side walls transversely. In the embodiment shown in the drawings, the upper level of the car 20 has no continuous roof and is left open at the top except for the braces 55. If desired, however, a continuous fixed roof may be provided for the upper level.

The upper level of the car 20 above the horizontal floor or wall 53 contains a pair of elongated equally sized compartments 56, similar to the single automobile compartments 24 but approximately twice as long as the latter and each adapted to contain two automobiles 28 in end-to-end relation, FIGURE 2. Each compartment 56, FIGURE 5, has a horizontal floor 57 and upstanding vertical side walls 58 in vertical alignment with the side walls 26 of the lower compartments 24 and in the same planes as the stationary side walls 45 of the car 20. Each long compartment 56 is U-shaped in cross section, FIGURE 5, and open at the top, although a roof may be provided on each compartment 56, if desired. The side walls 58 have large picture windows 59 in the regions thereof adjacent the transported automobiles, FIGURE 2. The floors 57 of compartments 56 are swiveled or pivoted at 60 to the divider wall 53 in a conventional manner and in the same manner that the lower compartments 24 are pivotally mounted, whereby the upper compartments 56 may be swung horizontally of the car body for side loading and unloading at the upper level from a suitable elevated ramp 61, as depicted in FIGURE 7.

The double automobile compartments 56 are provided at corresponding ends with vertically swingable gates 62, substantially identical in construction and for the same purpose as the previously-described gates 30 of the lower compartments 24. The gates 62 and compartment floors 57 have automobile wheel guiding rails 63 and 64 for the same purpose previously described in connection with the loading of the lower compartments 24. Longitudinal aisles 65 for walking passengers are likewise provided along corresponding sides of the upper compartments remote from their guide rails 64, FIGURE 2. One end of the longitudinal aisleway 65 on the upper level of the car communicates with the transverse passageway 43 leading to the stairs 42, so that passengers on the upper level may descend to the lower level for passage into other cars of the train or for leaving the car 20 when the same is at rest. The upper level of the car 20 does not communicate directly with other cars of the train and the passengers on the upper level must first descend by using the steps 42 to reach the door 41 leading to the adjacent train cars.

The left-hand upper compartment 56, FIGURE 2, is equipped at both ends thereof with one of the gates 62 while only one end of the other compartment 56 has a gate 62, as shown in FIGURE 2. The opposite end of this other compartment 56, FIGURE 6, has a modified vertically swingable gate 66 hinged thereto and adapted when lowered to lie flush within a recess 67 of the divider wall 53. As shown in FIGURE 9, the adjacent gate 62 may then be swung down so as to overlie the gate 66 and provide a substantially level floor throughout the upper level of the car spanned by compartments 56. This arrangement shown particularly in FIGURES 8 and 9 facilitates the loading of automobiles endwise onto the upper car level without swinging the compartments 56 upon their pivots 60 whenever this is advantageous, as it is in certain instances, such as before the train is made up or when the car 20 is the last car of the train. In other cases and more usually, the compartments 56 are individually side loaded and unloaded as depicted in FIGURE 7 by swinging the compartments 56 horizontally to transverse positions on the car body, as shown. When the upper compartments 56 are loaded by either arrangement, the gates 62 and the modified gate 66 are elevated and secured upright by any conventional latch means and the ends of the compartments are effectively closed for safety purposes except for the aisles 65.

Various other refinements and facilities may be provided in the car 20, such as conventional illumination and the like. Food or hot drink dispensing machines may be placed in the lounge room defined by the wall 44, for example, but these refinements form no part of the essential invention and will not be shown or described herein.

Essentially and by way of summary, the car 20 of the invention embodies a low bed or floor 21, an elevated or divider floor 53 and fixed side walls. The lower level between the bed 21 and the divider wall 53 contains three single automobile compartments 24 which are horizontally swingable as described for side loading only. The lower level of the car also contains the room facilities at the opposite ends thereof on the slightly elevated floor portions 22 above the trucks 23. The upper level above the divider wall 53 also has fixed side walls and a pair of two automobile capacity compartments 56 which are horizontally swingable for side loading, FIGURE 7, and which are also adapted for end loading without swinging, FIGURES 8 and 9.

The virtues of the construction will be readily apparent to those skilled in the art. The arrangement allows individual automobiles or any selected number of the total of seven automobiles to be loaded or unloaded from either side of the car 20 at appropriate stations having fixed or mobile ramp facilities to coact with the invention compartments. This eliminates the necessity for uncoupling the car 20 from the train or for long stops and delays, as would be required with conventional automobile carriers where there is no provision of swingable compartments for side loading and no provision for removing a particular automobile from a row without unloading them all. Passengers availing themselves of this car service can travel in comfort for long distances at reduced rates and without the necessity for driving and therefore with increased safety. For slight additional expense, such passengers can avail themselves of other well-known train facilities including dining car facilities.

The overall dimensions of the invention car 20 are within limits to comply with regulations and to enable the car to negotiate conventional trackage and pass under all existing overhead structures, tunnels and the like. The arrangement of the compartments is compact and space-saving and allows the transporting of a maximum number of automobiles in a highly efficient manner and with economy as compared to known prior art means.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A railroad car for transporting automobiles comprising a car body having a depressed bed, side walls and a horizontal divider wall substantially midway between the top of the car and said bed, the top of said car body being open between said side walls, trucks underlying the car body near opposite ends thereof for supporting the same on rails, the tops of said trucks disposed above the elevation of said depressed bed, said side walls of the car body having a plurality of openings formed therethrough between the low bed and divider wall and another plurality of openings formed therethrough above said divider wall, three single automobile capacity relatively short length compartments pivotally mounted on said low bed and swingable horizontally thereon in opposite directions and within said side wall openings toward and from loading and unloading positions diagonally of said car, each said compartment being substantially U-shaped and having a floor and upstanding side walls, vertically swingable drop gates hinged to the opposite ends of the floor of each said compartment, a single pair of two automobile capacity relatively short length compartments arranged above said divider wall and pivotally secured thereto for horizontal swinging movement within said side wall openings toward and from loading and unloading positions diagonally of the car, each compartment of said single pair being U-shaped and having a floor and upstanding side walls, said upstanding side walls of all of the compartments forming the only closure means for the openings of the car body side walls when the compartments are in longitudinal non-loading positions, drop gates hingedly secured to opposite ends of the floors of each two automobile capacity compartment, and passage means within said car body placing the upper and lower levels thereof above and below said divider wall in communication for walking passengers.

2. A railroad car for transporting vehicles and facilitating efficient loading and unloading thereof, said car comprising a two-level car body having a lower bed, an elevated horizontal divider wall between the bed and the top of the car body and vertical side walls connected with the bed and divider wall, said side walls each having a plurality of upper and lower level laterally aligned pairs of openings formed therethrough, a first plurality of lower level independently horizontally swingable U-shaped vehicle compartments pivotally mounted upon the lower bed and each having a horizontal floor and upstanding side walls adapted to enter and substantially close one pair of lower level side wall openings when the lower level compartments are disposed longitudinally of the car, and a second plurality of upper level independently horzizontally swingable U-shaped vehicle compartments pivotally mounted upon said divider wall and each having a horizontal floor and upstanding side walls adapted to enter and substantially close one pair of the upper level side wall openings of the car body when the upper level compartments are disposed longitudinally of the car, said upper and lower level compartments independently swingable to diagonal positions upon the car body to allow selective loading and unloading of the compartments on either side of the car body at either level thereof.

3. A railroad car particularly for transporting vehicles, said car comprising a two-level car body having trucks beneath opposite end portions thereof to support the same on rails, said car body having a depressed horizontal bed beneath said trucks at an elevation beneath the tops of the trucks and upstanding side walls rising from said bed and a horizontal divider wall substantially midway between the bed and the top of the car body and rigidly interconnecting said side walls, said divider wall defining in the car body upper and lower levels, said side walls provided between the divider wall and lower bed with three laterally aligned pairs of rectangular openings therethrough collectively spanning the major portion of the distance between said trucks and extending substantially for the full distance between the lower bed and divider wall, three lower level vehicle compartments pivotally mounted upon the lower bed adjacent said pairs of side wall openings and between the side walls and being substantially U-shaped and having sides which substantially close said wall openings when the compartments are aligned longitudinally with the car body, said compartments independently swingable horizontally to positions diagonally of the car body for loading or unloading from either side of the car body, said side walls provided above the divider wall with two pairs of laterally aligned long rectangular openings collectively spanning the major portion of the length of the car body, each upper level side wall opening approximately twice as long as the aforenamed lower level side wall openings, the upper level side wall openings extending substantially from said divider wall through the upper edges of the side wall, and a single pair of upper level two vehicle capacity compartments pivotally mounted upon said divider wall adjacent the long upper level side wall openings and between the side walls and being substantially U-shaped and having sides which substantially close the side wall openings when said compartments are aligned longitudinally with the car body, the upper level compartments independently swingable horizontally to positions diagonally of the car body for loading or unloading from either side of the car body.

4. The invention as defined by claim 2, and vertically swingable drop gate means secured to each end of each lower level and upper level vehicle compartment and adapted to be elevated for closing the ends of the compartments and to be lowered to provide unloading ramps on the ends of the compartments.

5. The invention as defined by claim 4, and vehicle wheel guide rails on each drop gate means, and a coacting guide rail mounted upon the bottom wall of each upper and lower level vehicle compartment.

References Cited by the Examiner

UNITED STATES PATENTS

| | | | |
|---|---|---|---|
| 1,545,890 | 7/1925 | Fowler | 105—368 |
| 2,088,655 | 8/1937 | King | 105—368 |
| 2,211,469 | 8/1940 | King | 105—340 |
| 2,524,260 | 10/1950 | Hutson | 105—340 |
| 2,659,318 | 11/1953 | Steins et al. | 105—368 |
| 2,690,141 | 9/1954 | King | 105—340 |
| 2,695,568 | 11/1954 | Keith | 105—340 |
| 2,994,159 | 8/1961 | Bonidie | 105—368 X |
| 3,149,583 | 9/1964 | Morrill | 105—368 |

ARTHUR L. LA POINT, *Primary Examiner.*

MILTON BUCHLER, *Examiner.*